UNITED STATES PATENT OFFICE.

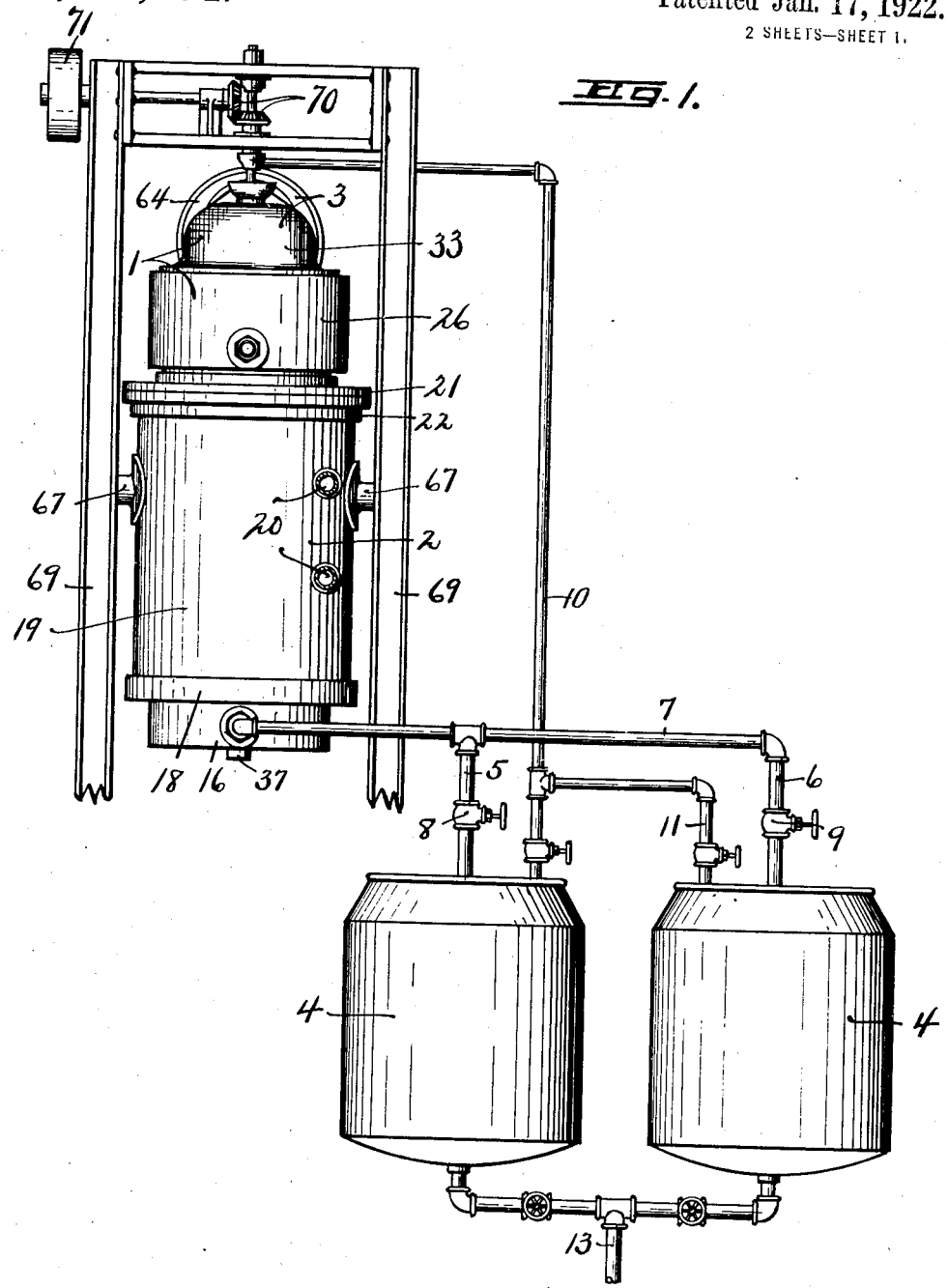

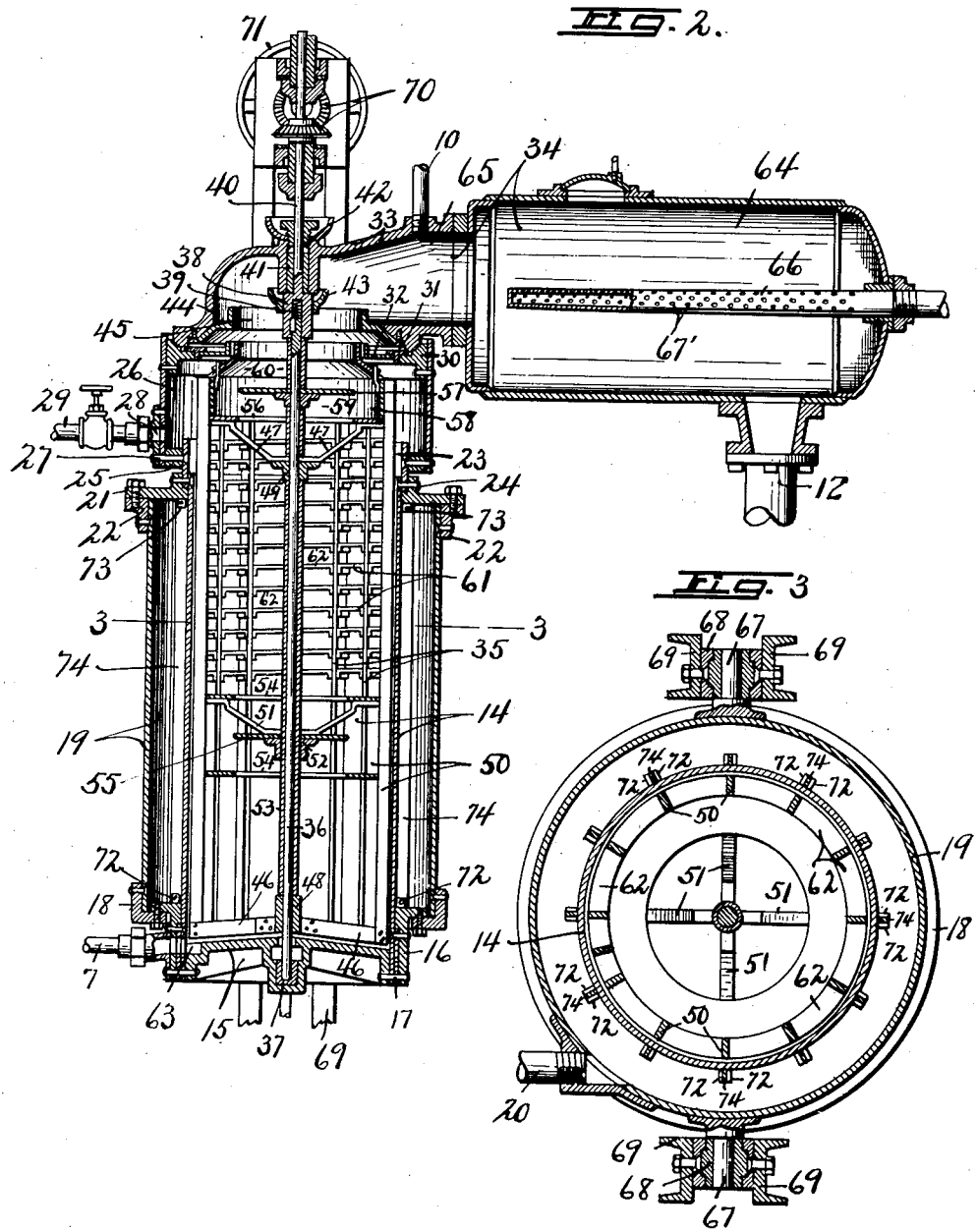

IRVING S. MERRELL, OF SYRACUSE, NEW YORK, ASSIGNOR TO MERRELL-SOULE COMPANY, OF SYRACUSE, NEW YORK, A CORPORATION OF NEW YORK.

CONDENSING APPARATUS.

1,403,804.  Specification of Letters Patent.  Patented Jan. 17, 1922.

Original application filed October 30, 1916, Serial No. 128,606. Divided and this application filed January 2, 1917. Serial No. 140,091.

*To all whom it may concern:*

Be it known that I, IRVING S. MERRELL, a citizen of the United States of America, and resident of Syracuse, in the county of Onondaga, in the State of New York, have invented new and useful Improvements in Condensing Apparatus, of which the following, taken in connection with the accompanying drawings, is a full, clear, and exact description.

This invention relates to the production of food products, particularly milk products, and to a new and improved process and apparatus for carrying out said process in the production of such products and is a division of my co-pending application, Serial No. 128,606, filed October 30, 1916.

I have discovered that it is possible to make a new and improved condensed milk and to produce new and improved milk powder therefrom, and I have produced such new and improved condensed milk and milk powder.

I have discovered a process whereby said new and improved condensed milk may be made, and have demonstrated that this process is commercially practical, efficient and economical.

I have invented an apparatus whereby said process may be advantageously utilized.

I have discovered that said process and apparatus may be advantageously applied also to the condensation of other liquids, and particularly those containing organic material, such as juices, saps, pulps, extracts, and including also other organic liquids, particularly susceptible to injury when subjected to relatively high temperatures for considerable periods of time, such as eggs, medicaments, or active organisms, such as yeast, diastase, pepsin, etc.

The process discovered by me is a continous one and involves a centrifugally produced flowing layer of milk moving over a heated surface in a high vacuum. By high vacuum is intended a vacuum of upwards of 18″ of mercury, the vacuum used in practice being from 23″ to 26″ of mercury, corresponding to a milk vaporizing temperature of 144° to 120°. The centrifugal force, as for instance of a rotary beater, constantly tends to arrange the heaviest parts of the liquid against the hot wall or surface, but the heat lightens the liquid by producing vapor in it and thus compels it to retreat from the wall to make place for the non-vaporized heavier portion, thus constantly arranging the light vapor-containing liquid nearer the center of the beater where its vapor may escape most readily, and constantly arranging the non-vaporized liquid nearest the heated surface where it receives the greatest heat.

By reason of this action, bubbles can remain only momentarily in contact with the heated surface. The moment any of the liquid boils, it is immediately displaced by the heavier non-boiling liquid and moved inwardly, and the vapor, separated from the liquid by the centrifugal action of the beater, is discharged, while the liquid containing the solids is thrown back into the moving layer of milk.

This automatic action of the centrifugal force constantly moving the cooler portions of the liquid into contact with the heated wall and constantly withdrawing the boiling portion with its bubbles and continuously heating all portions of the milk not in contact with the heated surface, by transfer of heat from the inwardly moving bubbles, accomplishes a uniform heating of the milk and eliminates scorching of the material which occurs when bubbles remain in contact with the heating surface.

The milk or other liquid may be introduced at the upper portion of a vertically disposed cylindrical chamber and allowed to flow downwardly along the interior walls of the chamber and be discharged at the bottom into a tank under substantially the same vacuum as the cylinder.

During its passage through the cylindrical chamber, the layer of milk is at all times in contact with the heated surface and is uniformly subjected to the heat, whereby the evaporation and condensation is uniform and is effected during the relatively short period of time consumed by the passage of the milk through the chamber, approximately a minute and a quarter to condense skim milk 3 or 4 to 1 in the particular size of apparatus hereinafter described. When the mechanically forced flowing layer of milk reaches the vaporizing temperature, it is not cooled by, or its temperature averaged with, a constantly replenished adjacent body of milk of different temperature. All of the liquid passing through the chamber is continuously and uniformly heated by contact with the heated wall and by the transfer of heat from the centrifugally moving bubbles.

In the specific disclosure of this application, the milk travels spirally downward upon the interior surface of a heated cylinder in substantially the form of a film and is preferably retarded somewhat during the early stages of its progress down the cylindrical wall so that the milk which flows most rapidly in its thin entering state is subjected to contact with the heated wall for a somewhat longer period of time than it would be if allowed to freely flow along the wall of the cylinder, whereby the heat of the cylindrical wall is applied for the greatest length of time to the thin entering milk which can best withstand the action of the heat, due to the high proportion of its liquid constituents, the thicker condensed milk approaching the bottom of the chamber being allowed to freely flow down the wall of the cylinder and escape from the bottom of the chamber.

The mechanical movement of the milk continues to subject it uniformly to the vaporizing temperature as the viscosity increases. The briefness of the time during which the milk is subjected to the vaporizing temperature and the uniformity of subjection to this temperature reduce to a minimum any change in the constituents, and by reason of this the product produced has substantially the flavor of the original milk and is susceptible of preservation without appreciable change for long periods of time.

Further, it is found that condensed milk produced by the process herein is less viscid for the same percentage of solids than known condensed milk, permitting a considerably greater degree of condensation without relative variance of the liquid condition or increase of viscosity. This feature, in addition to its being a marked improvement in condensed milk as a product, is of great importance in desiccation of preconcentrated milk by the spraying process.

The process described herein is applicable to the condensation of milk, including skim milk and milk containing butter fats, such as whole milk and cream, and as a preliminary step in the production of skim milk powder and milk powder containing butter fats, as whole milk powder or cream powder. The products embodying butter fats have certain improved characteristics in addition to the features of improvement in the skim milk products.

The condensing process herein described is peculiarly and specifically adapted for use in the production of milk powder by the spraying process described in patent No. 860,929, dated July 23, 1907, and new and improved milk powder products are produced thereby.

The condensed milk products of this application are improved in the following characteristics:
1. Improved flavor.
2. Improved keeping quality.
3. Less viscid for the same percentage of solids than the known product.

Other objects and advantages will appear from the following description, taken in connection with the accompanying drawings, in which—

Figure 1 is an elevation of the apparatus.

Figure 2 is a vertical cross section of the liquid-condensing chamber and the vapor-condensing chamber connected thereto.

Figure 3 is a cross section on line 3—3, Figure 2.

The apparatus broadly, as shown in Figure 1, comprises a condensing apparatus —1— consisting of a steam-jacketed liquid-condensing chamber —2—, a vapor-condensing chamber —3— connected thereto for the production of high vacuum therein and a series of milk-receiving tanks —4— connected to the chamber —2— by pipes —5— and —6—, respectively, each in communication with a common pipe —7—, and each provided with valves —8— and —9—, respectively, for controlling the flow of the liquid.

The tanks are likewise connected to the vapor-condensing apparatus —3— by pipes —10— and —11— for producing the same degree of vacuum in any or all of said tanks that exists in the vapor-condensing apparatus and the liquid-condensing chamber.

The pipe —12,— shown in Figure 2, leading from the vapor-condensing chamber —3— is adapted to be connected to any suitable pump capable of forming a seal for said chamber while permitting the withdrawal of water therefrom.

The tanks —4— may, as shown, be suitably and independently connected through valve conduits with a pipe —13— for conveying the milk from the tank or tanks as desired.

The liquid-condensing apparatus comprises, as shown, a vertically disposed cylinder —14— formed preferably of thin sheet metal, such as sheet tin, and having is lower edge confined between a bottom casting —15— and a side casting —16—, the two castings and the lower portion of the cylinder being secured together in any suitable manner, as by bolts —17—. The casting —16— carries an angular ring-shaped casting —18— to which is secured a vertically disposed cylindrical shell —19— surrounding the cylinder —14— and forming a chamber for receiving a heating agent, such as steam, as through a suitable inlet —20—. Any suitable condensation outlet may be provided.

The upper edge of the cylinder —14— is secured in any suitable manner, as by rivets or the like, to a ring-shaped casting —21— which in turn is secured to a second angular ring-shaped casting —22—, the upper edge of the shell —19— being secured to the casting —22— in any suitable manner, as by rivets or the like.

The casting —21— is preferably provided with a stepped portion upon its inner side, in which and between the casting —21— and the cylinder —14—, the edge of the cylindrical band-like member —23— is adapted to be seated and suitable rivets —24— extend through the casting, through the plate and through the cylinder for securing the parts together for the purpose of making a substantially smooth, even interior contour. The cylinder is provided with frusto-conical countersunk portions adapted to be drawn into the opening in the band —23— by frusto-conical heads upon the bolts or rivets —24—.

A ring member —25— of sufficient interior diameter is tightly fitted over the band —23— and carries a cylindrical sheet metal section —26—. A series of rivets or bolts —27— having their inner ends countersunk in the band —23— serve to connect these members together and the ring —25— is spaced downwardly a sufficient distance from the uper edge of the band —23— to form a liquid-receiving channel between the plate —23— and the section —26—, and this channel is provided with a suitable inlet —28— connected to an inlet pipe —29— for conveying the fluid to the trough.

The section —26— carries a ring-shaped, radially and inwardly projecting casting —30— and this casting in turn carries a T-shaped ring —31—, the T-shaped casting in turn carrying a flanged disk —32—. A suitable groove is formed between the T-shaped member —31— and the casting —30— for the reception of suitable packing to form an air-tight joint between this portion of the apparatus and the cap —33— of a suitable vapor-condensing apparatus —34—, the nature of which will be hereinafter described.

Within the cylinder —14— is mounted a rotary beater —35— comprising a vertical shaft —36— and having its lower end journaled in a bearing —37— formed in the casting —15— and its upper end removably mounted and feather and keyed to a hub —38— provided with a suitable end-thrust spring —39— for resiliently holding the shaft to its bearing —37—.

The hub —38— is formed integral with the shaft —40— which has a suitable bearing —41— in the cap —33—, the entrance of air to the cap being prevented by a suitable packed joint —42—, and preferably the hub —38— carries a suitable grease cup —43— adapted to collect oil or other foreign matter that may flow from the packed joint —42—, from which cup the foreign matter is thrown centrifugally outwardly by the high speed rotation of the cup and is collected in the channel —44— formed by a suitable flanged, ring-shaped member —45— secured to the cap —33— and discharging into the vapor-condensing apparatus —34—.

The shaft —36— carries a series of radiating arms —46— and a similar series of radiating braces —47—, the former positioned adjacent the lower end of the shaft and the latter adjacent the upper end of the shaft, and may, as shown, be mounted, respectively, upon sleeve castings —48— and —49—, respectively mounted upon the shaft —36—.

These arms and braces carry a series of vertically disposed bars —50—, in this specific illustration twelve in number, and being equal in number to the radiating arms and braces, respectively. An intermediate series of radiating arms or braces —51—, may, as shown, be provided for giving to the beater greater strength and rigidity and these arms may in like manner be mounted or carried by a sleeve —52— secured to a sleeve 53.

The shaft —36— may, as shown, be provided with an external sleeve —53— and this sleeve may, as indicated, be formed in sections, between which sections the castings may be positioned to assist in preventing endwise movement of the same or, as shown, with casting —52—, the castings may be mounted externally of the sleeve and secured thereto in any suitable manner.

The beater bars or arms —50— preferably extend some distance above the band —23— and lie radially in close proximity to the interior surface of the cylinder —14— to compel the liquid to flow in a film upon such surface. A suitable series of baffles are provided in connection with the beater to cause the vapor to travel in a circuitous route and to impinge against the surface of the baffles, whereby any liquid carried in suspension will be separated from the vapor and returned by centrifugal force to the moving film of milk. Ring-shaped baffles —54— are secured to the bars —50— adjacent the interior lower portion of the beater, the upper of these baffles resting, as shown, upon the brace arms —51—. Intermediate the baffles —54— is a third baffle —55— of a diameter somewhat greater than the interior diameter of the ring baffle —54— and the baffle —55— may, as shown, be mounted on the casting —52—.

The upper portion of the beater carries a suitable ring-shaped baffle —56— and above it a disk baffle —57— of slightly greater diameter than the interior diameter of the baffle —56— and adapted to direct the vapor radially outward into contact with the hood —58— carried by and rotating with the beater and mounted upon the baffle —56— and vertically secured to the bars —50—. This may, as shown, be formed in two parts, a cylindrical portion —59— terminating adjacent the upper end of the beater bars —50— and a frusto-conical portion —60— secured to the cylindrical portion and provided with a cylindrical flange rotating within the flange upon the disk —32—. Suitable openings may be provided between the baffle —56— and the lower cylindrical portion —59— so that any liquid collected by the baffles or by the hood will flow downwardly upon the hood and be thrown centrifugally against the member —26— and into the trough between said member and the upper edge of the plate —23—.

The beater further preferably embodies a means for retarding the flow of the milk during the early portion of its progress down and around the interior surface of the cylinder and this means, as shown, comprises a series of aligned spirally arranged strips constituting a spiral pathway —61— extending round and round the beater and, as shown, this spiral pathway is formed of separate strips —62— of thin sheet metal arranged between the bars —50— and secured thereto and aligned with the adjacent strips between adjacent bars to form a continuous spiral extending downwardly from the baffle —56— to the baffle —54—, the inclination of the spiral being downwardly in the normal direction of rotation of the beater whereby, under rapid rotation, the spiral exerts an elevating force upon the liquid, thereby retarding its flow downwardly upon the surface of the cylinder.

To permit the discharge of the condensed liquid from the condensing chamber, the casting —15— is provided with a depression —63— at one edge and the cylinder —14— is provided with an opening aligned with said depression to permit the outflow of the liquid to the pipe —7— leading to the tanks —4—.

By reason of the fact that the tanks are under the same vacuum as the condensing chamber —14—, the liquid readily escapes through pipe —7— and is discharged from the chamber with the same relative degree of rapidity and in substantially the same succession as admitted to the chamber whereby the liquid is caused at all times and throughout the entire expanse of the cylinder to flow in a thin film and is not subjected to a stirring action by the beater.

The vapor-condensing apparatus —34— embodies a cylindrical chamber —64— communicating through neck —65— with the cap —33—. The chamber —64— contains a substantially centrally disposed pipe —66— provided with a plurality of perforations —67'— for discharging water in the form of spray into the chamber to condense the vapor which is drawn through the neck —65—, thereby producing a high degree of vacuum in the apparatus. The chamber —64— is further connected to a suitable pump or other apparatus constituting a water seal for the chamber. The condensing chamber —64—, neck —65— and cap —33— may preferably be mounted in stationary condition while the remaining portion of the apparatus is pivotally mounted and is vertically movable toward and from the cap, the particular mounting means forming no portion of the invention claimed herein and, as shown herein, the shell —19— is provided with journals —67— rotatably mounted in bearings —68—, which bearings are in turn vertically slidable along bars —69— constituting a supporting framework for the apparatus.

The cylinder —14— may, if desired, be reinforced in any suitable manner and for this purpose the castings —16— and —21— are provided with a series of axially projecting lugs —72— and —72—, respectively, to which lugs the opposite ends of the series of reinforced bars —74— are secured. The bars —74— may be secured to the cylinder, if desired, in any suitable manner, as by soldering, welding or the like.

The operation of the apparatus will be readily understood. Milk is admitted through pipe —29— in the proper regulated amount, flows from the upper edge of the band —23— forming a portion of the cylinder —14— and flows downwardly upon the interior surface of the cylinder and is carried in rapid rotary motion around the cylinder by the high speed movement of the beater. The contact of the milk in film form with the interior surface of the cylinder —14—, the exterior surface of said cylinder being heated to a proper temperature, causes the evaporation of a portion of the liquid constituents of the milk, the vapor moving inwardly while the heavier liquid is held by centrifugal force to the surface of the cylinder, the centrifugal force separating the vapor from the liquid and causing the vapor to move inwardly and upwardly into the condensing apparatus —64— in its passage being impinged against the baffle members, which in turn removes any remaining liquid carried by the vapor. The vapor is condensed by contact with the sprays of water in the chamber —64—, whereby the high vacuum required for producing the product described herein is obtained.

The liquid flows in film form throughout the entire expanse of the heated cylinder —14— and upon arrival at the bottom of the apparatus is immediately discharged through pipe —7—, due to the high degree of vacuum produced in tanks —4— through their connection with the neck —65—. The liquid, the core, during its entire contact with the heated surface is rapidly moving in film form. While the milk remains substantially in its thin entering state during the early stages of its flow down the interior surface of the cylinder, its movement is somewhat retarded by the elevating force of the spiral so that although it remains at all times in film form, it is subjected to contact with the heated surface for a period of time somewhat greater than would normally be possible.

Although I have shown and described one specific form of apparatus and the preferred manner of use of such apparatus in the production of improved milk products, I do not, so far as the method is concerned, desire to limit myself except as specifically set forth in the claims to any particular sequence of steps or to any particular form of construction of apparatus and, in so far as the apparatus is concerned, I do not desire to limit myself to any particular form or construction of the same, as many changes may be made in the details of both form and construction without departing from the spirit of this invention as set forth in the appended claims.

What I claim is:

1. In a condensing apparatus, a cylinder, a jacket surrounding the cylinder, means for causing the liquid to flow downwardly in a film upon the interior surface of said cylinder, and spiral means tending to elevate the liquid whereby the natural flow of the liquid is retarded.

2. A condensing apparatus comprising a vertically disposed jacketed container of substantially circular cross section, an inlet for the substance to be treated at the upper end of the container, centrifugal means for causing the substance to assume the form of a thin layer on the interior surface of the container and for rapidly moving the layer circularly over the surface while permitting the entire body of substance to move from the upper end toward the lower end of the container, means exerting an elevating force upon the liquid, a free outlet for the substance at the lower end of the container, and a vapor-condensing apparatus in communication with the container.

3. A condensing apparatus comprising a vertically disposed jacketed cylinder, means for introducing a liquid substance into the upper end of the cylinder, means for causing the liquid to flow circularly over the interior surface of the cylinder while it flows downwardly upon such surface under the action of gravity, helical means for retarding the flow of the liquid vertically of the cylinder, and a free discharge for the liquid at the bottom of the chamber.

4. A condensing apparatus comprising a vertically disposed jacketed cylinder, a trough surrounding the upper end of the cylinder, centrifugal means for causing the liquid overflowing from said trough to move rapidly in layer form circularly over the interior surface of said cylinder while gravity moves the entire body of liquid from the upper end of the cylinder toward the lower end thereof, helical means for retarding the flow of the liquid vertically of the cylinder, and a free discharge for the liquid at the bottom of the cylinder.

In witness whereof I have hereunto set my hand this 27th day of November, 1916.

IRVING S. MERRELL.

Witnesses:
E. A. THOMPSON,
ALICE M. CANNON.